United States Patent [19]

Fee et al.

[11] Patent Number: 5,485,576
[45] Date of Patent: Jan. 16, 1996

[54] CHASSIS FAULT TOLERANT SYSTEM MANAGEMENT BUS ARCHITECTURE FOR A NETWORKING

[76] Inventors: Brendan Fee, 34 Pemberton Rd., Nashua, N.H. 03036; Chris Oliver, 10 Stanley's Pond Dr., Rochester, N.H. 03869-4954

[21] Appl. No.: 188,033

[22] Filed: Jan. 28, 1994

[51] Int. Cl.$^6$ .......................... G06F 11/20; H04L 29/14; H04L 12/40
[52] U.S. Cl. .................. 395/185.09; 395/182.02; 395/858; 395/309; 370/16; 364/268; 364/268.7; 364/268.9; 364/269.2; 364/242.94; 364/DIG. 1
[58] Field of Search ...................... 395/325, 575, 395/650, 200, 425, 182.02, 185.09, 858, 309, 575; 371/8.1, 8.2; 370/60.1, 16

[56] References Cited

U.S. PATENT DOCUMENTS

| | | | |
|---|---|---|---|
| 4,679,189 | 7/1987 | Olson et al. | 370/60 |
| 4,720,780 | 1/1988 | Dolecek | 395/800 |
| 5,084,816 | 1/1992 | Boese et al. | 395/575 |
| 5,161,192 | 11/1992 | Carter et al. | 380/48 |
| 5,226,120 | 7/1993 | Brown et al. | 395/200 |
| 5,261,044 | 11/1993 | Dev et al. | 395/159 |
| 5,274,782 | 12/1993 | Chalasani et al. | 395/325 |
| 5,276,861 | 1/1994 | Howarth | 395/575 |
| 5,287,491 | 2/1994 | Hsu | 395/575 |
| 5,301,303 | 4/1994 | Abraham et al. | 395/500 |
| 5,341,496 | 8/1994 | Middledary et al. | 395/575 |
| 5,367,521 | 11/1994 | Sanchez et al. | 370/60 |

OTHER PUBLICATIONS

International Search Report from International Patent Application Number PCTUS95/01177, filed Jan. 26, 1995.
Greenfield, et al., "Smart Hub Vendors Move In On FDDI" Data Communications International, Oct. 1991, vol. 20, No. 14, pp. 113–114.
E. Hindin, "Wellfleet Strikes Back With Its Fastest Router Yet"]Data Communications International Sep. 1991, vol. 20, No. 11, pp. 137–138.
Coral Broadband Enterprise Switch, Product Literature, Coral Network Corporation, Marlborough, Mass. (1994).

*Primary Examiner*—Gopal C. Ray
*Attorney, Agent, or Firm*—Wolf, Greenfield & Sacks

[57] ABSTRACT

A fault tolerant system management bus architecture for a networking chassis includes a primary path for transmission of system management information and a secondary path for transmission of system management information in the event of failure of the primary path. The primary path includes a first microprocessor controller, coupled between the first system management bus and the processor located on a networking module. The secondary path for transmission of system management information includes a second microprocessor controller system and a dual-port memory. The second microprocessor control system is coupled to the second system management bus and to the dual-port memory. The dual-port memory is also coupled to the processor located on the networking module. The dual-port memory provides the interface between the CPU in the networking module and the second microprocessor control system, thus providing isolation and allowing the memory to be accessible by either processor. Environmental information and module identification information are stored in the dual-port memory. In the event of failure of the primary transmission path, the environmental information and module identification information can be accessed and transmitted over the backup transmission path.

21 Claims, 4 Drawing Sheets

| MODULE TYPE IDENTIFICATION |
|---|
| MODULE TYPE ASCII STRING |
| TOP LEVEL PART NUMBER |
| TOP LEVEL SERIAL NUMBER |
| TOP LEVEL REWORK LOCATION |
| TOP LEVEL REVISION |
| PRINTED CIRCUIT BOARD REVISION |
| BOARD LEVEL REVISION |
| ENGINEERING CHANGE ORDER NUMBER |
| DIAGNOSTIC TEST ERROR |
| BASE MAC (MEDIA ACCESS CONTROL) ADDRESS |
| NUMBER OF RESERVED MAC ADDRESSES |

CHASSIS FAULT TOLERANT SYSTEM MANAGEMENT BUS ARCHITECTURE FOR A NETWORKING

BACKGROUND OF THE INVENTION

1. Field of the Invention

The present invention relates generally to system management buses used to control modules in a networking chassis. More particularly, the present invention relates to a fault tolerant system management bus architecture for transmitting communications and control information between networking modules in a networking chassis.

2. Discussion of the Related Art

In a conventional networking chassis, for communication and control of individual networking modules, a single network connected to all of the networking modules is provided. This is called an "out-of-band" network. The out-of-band network typically is not accessible from outside the networking chassis and is only used to transmit communication and control information ("system management information") between networking modules within the chassis. The network that connects the ports on the networking chassis together for purposes of transmitting data from one workstation or network segment to another is called the "in-band" network. In a conventional networking chassis, the central processing unit (CPU) located on the network module that controls communication over the in-band network is also used to control data transmission over the out-of-band network as well. One problem with this type of system is that no fault tolerance is provided. If a problem occurs with the out-of-band network or with the networking module itself, there is no other path provided for transmission of system management information.

Some conventional networking chassis have provided two out-of-band networks wherein if there is a failure in one of the networks, system management information can be transmitted over the second out-of-band network. However, even in these systems, if the CPU of the networking module is off or has failed, no information regarding the status of the networking module can be obtained.

Therefore, an object of the present invention is to provide a system management bus architecture for a networking chassis that provides fault tolerant operation if there is a failure of the primary out-of-band network on a networking module.

Another object of the present invention is to provide a system management bus architecture for a networking chassis that allows information to be gathered about a module even if there is a failure of the primary out-of-band network.

Another object of the present invention is to provide a system management bus architecture for a networking chassis that allows for information to be gathered about the physical conditions and environment of the networking module.

SUMMARY OF THE INVENTION

The present invention overcomes the disadvantages of the prior art by providing a fault tolerant system management bus architecture for a networking chassis. The architecture provides a primary path for transmission of system management information and a secondary path for transmission of system management information in the event of failure of the primary path. The secondary path acts as a backup path for transmission of system management information. The networking chassis includes two system management buses coupled to each networking module. The primary path (primary out-of-band network) includes a first microprocessor controller coupled between the first system management bus and the processor located on the networking module. The secondary or backup path (secondary out-of-band network) for transmission of system management information includes a second microprocessor controller system and a dual-port memory. The second microprocessor controller system is coupled to the second or backup system management bus and to one of the ports of the dual-port memory and the other port of the dual-port memory is coupled to the processor located on the networking module. The dual-port memory provides the interface between the processor on the networking module and the second microprocessor controller system, thus providing isolation between the networking module and the processor/primary out-of-band network. The information stored in the dual-port memory is accessible by the processor on the networking module and the second microprocessor controller system.

In one embodiment of the invention, the primary system management bus is a ten megabit/second ethernet network that operates according to IEEE Standard 802.3. In one embodiment of the invention, the second or backup system management bus is a LOCALTALK network.

The first microprocessor controller and the second microprocessor controller system are powered by different power supplies so that in the event of failure of the primary power source that powers the first microprocessor controller, the backup path can remain operating.

The primary information transmission path is used for transmission of system management information when the networking module and the first system management bus are operating properly. If the primary transmission path should fail, the second information transmission path may be used to obtain information concerning the status of the CPU on the networking module as well as to provide some limited processing of data that would normally be transmitted over the primary out-of-band network or processed by the CPU on the networking module.

Additionally, the second microprocessor controller system monitors environmental information including temperature of the module, module voltages, and module currents and stores this information in the dual-port memory. The dual-port memory also stores module identification information such as part number, serial number, and revision level of the networking module. The module identification information is stored in the dual-port memory by the CPU on the networking module. The dual-port memory thus provides the interface between the CPU on the networking module and the second microprocessor controller system. The environmental information and the module identification information (collectively, the "network variables") is also stored in a nonvolatile memory so that in the event of a module failure or a failure of the primary power supply, the information is not lost and can still be transmitted over the secondary out-of-band network. This environmental information and module identification information may then be transmitted over the primary out-of-band network to the chassis management agent. If the primary out-of-band network or the processor on the networking module has failed, the environmental information and module identification information can be transmitted over the secondary out-of-band network to the networking chassis management agent.

The features and advantages of the present invention will be more readily understood and apparent from the following detailed description of the invention, which should be read in conjunction with the accompanying drawings, and from the claims which are appended at the end of the detailed description.

BRIEF DESCRIPTION OF THE DRAWINGS

In the drawings, which are incorporated herein by reference and in which like elements have been given like reference characters.

Appendix A is a Shared Memory Manager design and pseudo code implementation that may be used to control the dual-port memory used in the present invention, incorporated herein by reference in its entirety.

DETAILED DESCRIPTION

The subject matter of the present application may be advantageously combined with the subject matters of the following copending and commonly owned applications Ser. Nos. 08/187,856, filed Jan. 28, 1994 and 08/188,238, filed Jan. 28, 1994, and which are hereby incorporated by reference in their entirety:

Distributed Chassis Agent For Network Management by Fee, et al.

Network Having Secure Fast Packet Switching and Guaranteed Quality of Service by Dobbins, et al.

The present invention is particularly useful in the networking chassis described in the referenced applications. As described in those applications, the networking chassis includes a plurality of networking modules and a chassis backplane.

Figure 1:
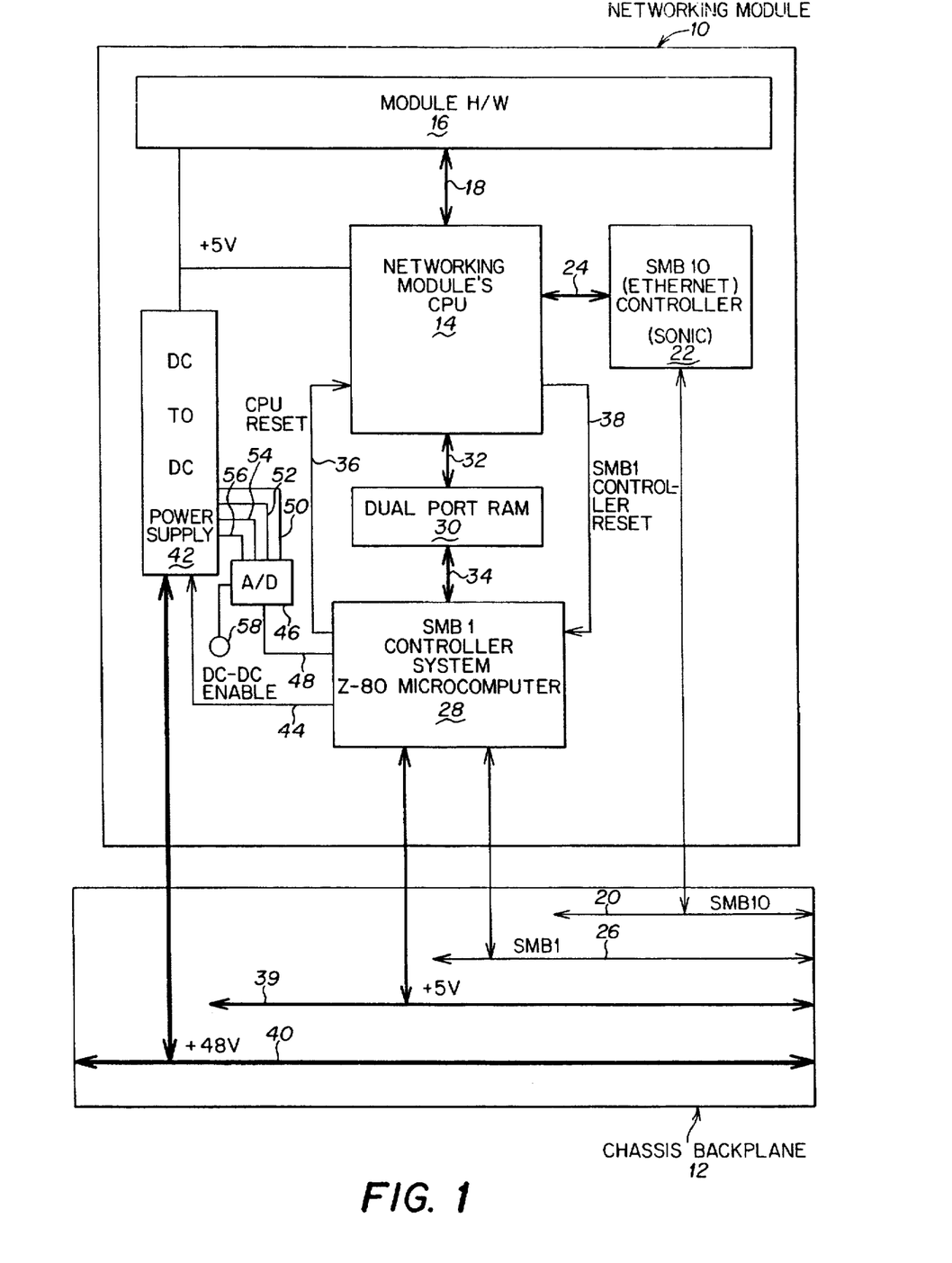
FIG. 1 is a schematic block diagram of the fault tolerant system management bus system architecture of the present invention.

Referring to FIG. 1, there is shown a networking module 10 and a chassis backplane 12 as described in the above-referenced and incorporated application. The networking module 10 includes a central processing unit (CPU) 14 that is used to control the processing carried out on the data received over the in-band network (not shown) by module 10. The CPU 14 controls the module hardware, shown schematically as block 16, over address, control, and data lines 18. Circuitry 16 includes appropriate circuitry necessary to carry out the processing function or functions on module 10, such as bridging and routing. In one embodiment of networking module 10, CPU 14 is an i960 processor available from Intel Corporation. The present invention may be used with any type of processor 14 and module hardware 16.

The primary path (out-of-band network) includes system management bus 20 and microprocessor controller 22. CPU 14 receives system management information from bus 20 via microprocessor controller 22 and address, data, and control lines 24. In one embodiment of the invention, microprocessor controller 22 is a DP83932B systems oriented network interface controller available from National Semiconductor Corporation. In one embodiment of the invention, system management bus 20 is a conventional ethernet IEEE 802.3 network operating with a bit transfer rate of ten megabits/second. System management bus 20 and microprocessor controller 22 form the primary path between networking module 10 and the chassis management agent.

A second system management bus 26 is also provided on chassis backplane 12. A second microprocessor controller system 28 is used to couple system management bus 26 to module CPU 14 through a dual-port RAM 30 via address, control, and data lines 32 and 34. The combination of system management bus 26, microprocessor control system 28, and dual-port RAM 30 provides a secondary or backup path for transmission of system management information. In one embodiment of the invention, system management bus 26 may be a LOCALTALK serial bus having an increased clock rate such that data may be transmitted over the bus at a rate of 1 megabit/second. LOCALTALK hardware specifications and software protocols are described in Inside Appletalk, Second Edition, published by Apple Computer, Inc.© 1990, which is incorporated herein by reference.

A reset line 36 is provided from microprocessor system 28 to the CPU 14, allowing CPU 14 to be reset in the event of failure of, for example, the primary system management information transmission path or the software running on networking module 10. In a like manner, reset line 38 is provided from networking module CPU 14 to the second microprocessor controller system 28 to allow CPU 14 to reset microprocessor controller system 28.

A key feature of the present invention is that the secondary system management information transmission path is powered by a separate power supply from the power supply used to power the rest of the circuitry on networking module 10. In the illustrated embodiment of the invention, the second microprocessor controller system 28 is powered by a separate 5 volt supply line 38 on chassis backplane 12. The remainder of networking module 10, including CPU 14 and the primary system management information transmission path is powered by a separate 48 volt supply line 40 on chassis backplane 12.

The 48 volt supply line is connected to DC-to-DC converter 42. DC-to-DC converter 42 converts the 48 volts into the appropriate voltages, such as 5 volts as illustrated, for supplying power to the various electrical components on networking module 10, such as module hardware 16, CPU 14, and the first microprocessor controller 22. An enable line 44 from the second microprocessor controller system 28 is used to enable or disable DC-to-DC converter 42, thus allowing the second microprocessor controller system 28 to turn networking module 10 on and off.

An analog-to-digital converter 46 is also provided on networking module 10 to allow for monitoring of environment variables. The digital output of analog-to-digital converter 46 is coupled to the second microprocessor controller system 28 via data and control lines 48. Analog-to-digital converter 46 is used to convert analog signals from DC-to-DC converter 42 representative of the voltage of 48 volt supply line 40, the current delivered by 48 volt supply line 40, the voltage output by DC-to-DC converter 42 and the current output by DC-to-DC converter 42 over lines 50, 52, 54, and 56, respectively, so that these parameters can be monitored. In addition, analog-to-digital converter 46 receives a signal from temperature sensor 58, thus allowing the temperature of networking module 10 and its environment to be monitored. In one embodiment of the invention, analog-to-digital converter 46 is a model number MC14051 available from Motorola Semiconductor. The environmental information gathered by the second microprocessor controller system 28 may be passed between networking modules via system management bus 26 because this information is typically relatively small data packets that do not require the capabilities of the primary system management bus. However, networking module processor 14 and the primary system management bus have access to the environment information because it is stored in dual-port memory 30.

Figure 2:
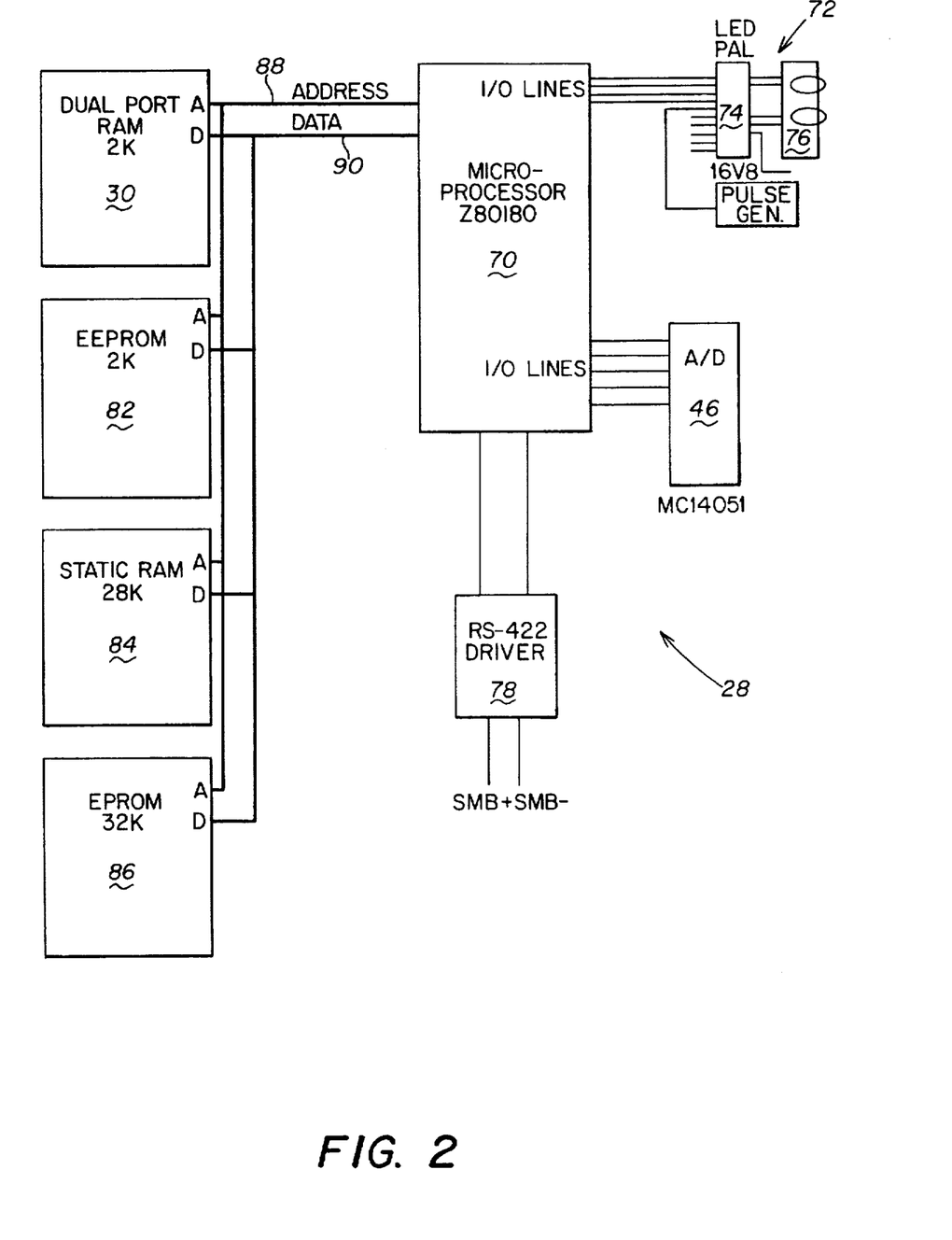
FIG. 2 is a schematic block diagram of the second microprocessor controller system that may be used for data transmission over the secondary out-of-band network in the system illustrated in FIG. 1.

Reference is now made to FIG. 2 which illustrates in more detail the second microprocessor controller system 28.

Figure 3:
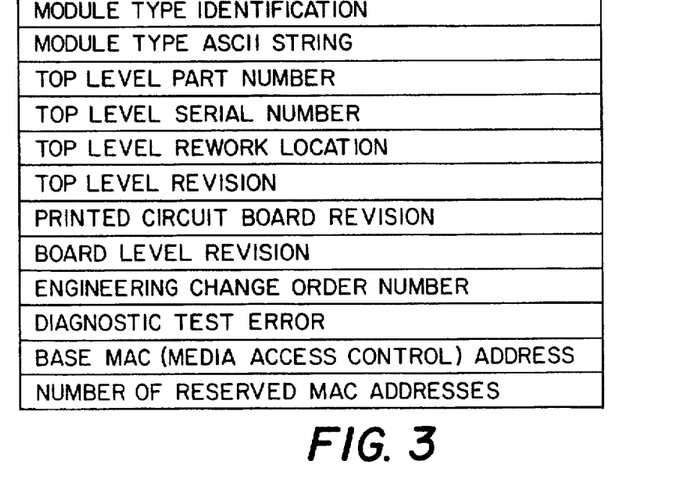
FIG. 3 is a listing of the information that may be stored in the dual-port memory and the non-volatile memory of the second microprocessor controller system illustrated in FIG. 2.

In one embodiment of the invention, the second microprocessor control system includes a microprocessor 70 which may be a Z80180 microprocessor available from Zilog Corporation. The second microprocessor controller system 28 also includes a light emitting diode subsystem 72 including a programmable array logic (PAL) component 74 and light emitting diodes 76. Light emitting diode subsystem 72 may be used to indicate the status of networking module 10 to a user. A bus driver, such as RS-422 driver 78 is used to interface microprocessor 70 to system management bus 26. Memories 30, 82, 84, and 86 are coupled to microprocessor 70 using address and data lines 88 and 90, respectively. The memory 82 is a nonvolatile memory and is used to store identification information about networking module 10 as the information such shown in FIG. 3. The memory 84 is the working memory for the microprocessor 70. The memory 86 is used to store the program memory that operates microprocessor 70.

As previously discussed, dual-port memory 30 provides the interface between microprocessor 70 and the CPU 14 on the networking module. Dual-port memory 30 provides isolation between microprocessor control system 28 and CPU 14. Dual-port memory 30 may be an IDT 7321 CMOS DUAL PORT RAM available from Integrated Device Technology, Inc. An interrupt system is used to alert processor 14 and microprocessor 70 to communications from either processor. This is done by writing to a predefined memory location. For example, microprocessor 70 may write data into the predefined memory location. This causes memory 30 to generate an interrupt to processor 14. When processor 14 reads the data from the predefined memory location, an interrupt flag is reset and processor 14 can resume execution of its program. More generally, control of dual-port RAM 30 is accomplished using a shared memory manager program stored in program memory 86. Appendix A illustrates a design and pseudo code implementation of a shared memory manager that may be used to control dual-port memory 30.

During operation, the system management bus operates in a fault tolerant, non-load sharing manner with system management bus 20 and controller 22 acting as the primary system management information transmission path and system management bus 26 and microprocessor controller system 28 acting as the secondary or backup system management information transmission path. Except for environmental information, system management information is always transmitted over the primary path and the backup system is only used when there is a failure of the primary transmission path.

The environment variables, such as module voltage, current, and temperature are stored in dual-port ram 30. Module identification information such as the module part number, serial number, and revision level (illustrated in FIG. 3), are stored in dual-port memory 30, as well as in nonvolatile memory 82. The module identification information is supplied by CPU 14 and stored in dual-port memory 30 during, for example, the initialization and power up sequence of networking module 10. The module identification information is also stored in nonvolatile memory 82 by microprocessor 70. Therefore, if the networking module, CPU 14, or the primary system management information transmission path should fail, the module identification information and environment variables (collectively the "network variables") is still available to the backup system management information transmission path. This provides a particular advantage in that this information can be accessed remotely so that the identity and type of networking module can be ascertained before a service person visits the actual location of the networking chassis, thus providing a considerable time savings, since the defective module type can be identified and a replacement part brought with the service person to the site of the networking chassis.

Figure 4:
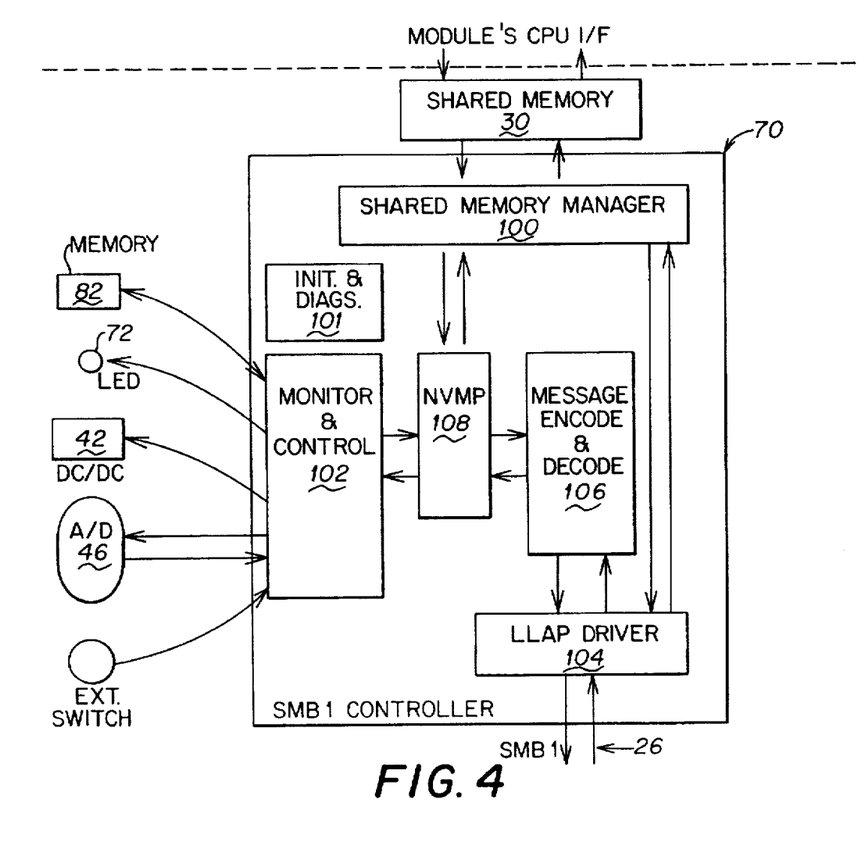
FIG. 4 is a schematic block diagram of the software modules used to program the second microprocessor controller system.

Reference is now made to FIG. 4, which illustrates, in schematic block diagram form, the software modules used to program the second microprocessor 70. The software modules include the shared memory manager software 100 that is used to control shared memory 30. As discussed previously, Appendix A is a shared memory manager design and pseudo code implementation that may be used. Module 101 contains software for initializing microprocessor at power on or after a reset, as well as diagnostic routines. Module 102 is a monitor and control software module that is used to provide the interface between analog-to-digital converter 46 and DC-to-DC converter 42 and microprocessor 70. LLAP driver module 104 is a local LOCALTALK link access protocol software module that provides the interface to LOCALTALK network 26. LLAP driver 104 may be designed in accordance with the aforementioned Inside AppleTalk reference. Module 106 is a message encode (for information to be transmitted over bus 26) and decode (for messages received from bus 26) module that provides any necessary protocol translation between LLAP driver-104 and NVMP module 108. Message encode and decode module 106 may be designed in accordance with the protocols and specifications described in Internetworking with TCP/IP, Vol. 1, Principals, Protocols, and Architecture, 2d Edition by Douglas E. Comer, published by Prentice Hall, Incorporated,© 1991, incorporated herein by reference in its entirety.

NVMP module 108 is a Network Variable Monitoring Protocol Module that is used to provide the interface between modules 100, 102, and 106 to gather, store, and transmit environmental and module identification information. The network variable monitoring protocol generally follows the Simple Network Management Protocol (SNMP) protocol paradigm as referenced in the incorporated Distributed Chassis Agent for Network Management application.

Figure 5:
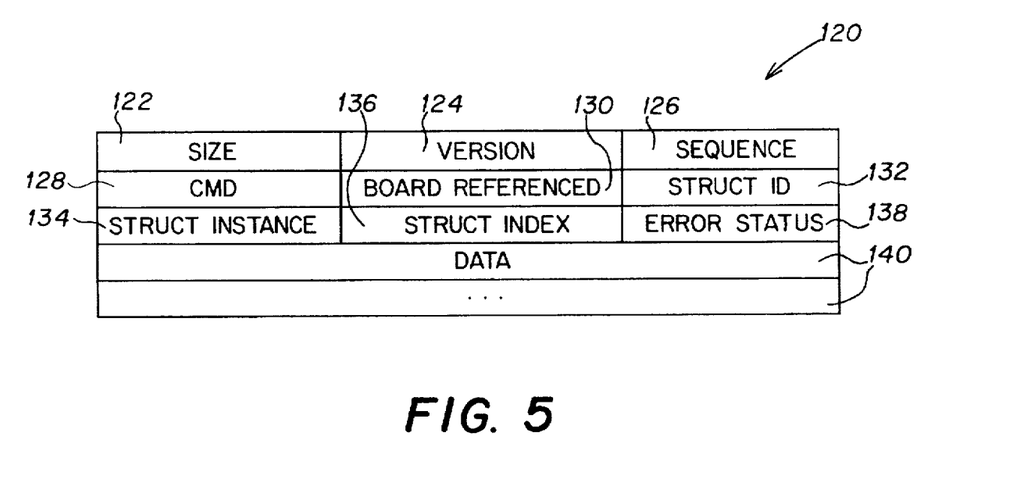
FIG. 5 is a diagram of a data structure used in the programs of FIG. 5.

Reference is now made to FIG. 5, which illustrates the format of a data structure used in the NVMP module 108 to transmit a message. The data structure 120 includes a number of fields. Each of the fields is one byte in length. The size field 122 contains the length of the entire data structure including size field 122. The version field 124 identifies version of the software used to format the message. The sequence field 126 contains a monotonically increasing number that is used to match a response with a corresponding message that initiated the transmission of the data structure.

The command field 128 is used to distinguish the different processing actions to be taken regarding the data structure. There are three commands that are recognized by NVMP module 128. The first command is a "set" command that is used to set values of an entire data structure. The second command is a "get" command that is used to get values of an entire data structure. The third command is a "trap" command that is used to indicate an alarm condition such as host failure. The most significant bit of the command field is used to indicate whether there has been a response. The program always sends a response to inform the sending process whether or not the data structure was received successfully.

The board referenced identification field 130 is an optional field and is used to indicate the particular networking module about which information is being gathered. The structure indentification field 132 is used to reference the particular type of network variable. The structure instance field 134 is used to identify a particular instance of the network variable identified in field 132. The structure index field 136 is used to control access to the fields in the data structure. For example, if the index is set to 0, the whole data structure may be accessed.

The error status field 138 is used to indicate if an error has occurred. A value of "0" in this field may be used to indicate that there has been no error. A value of "1" in this field may be used to indicate that the requested operation identified an unknown structure. A value of "2" may be used to indicate that the requested operation identified an unknown variable. A value of "3" may be used to indicate that the requested operation specified an incorrect syntax when trying to modify a structure or variable. A value of "4" may be used to indicate that the requested operation tried to modify a structure or variable that is readable only. A value of "5" may be used to indicate that the requested operation tried to read a command structure.

Data field 140 is used to store the actual data for the variable being monitored, such as voltage, current, or temperature. For example, if the command is a "get" command, the data field will be empty for an incoming data packet and will be filled in with the appropriate data when the data structure is transmitted in reply to the request. If the command in the command field is a "set" command, then in an incoming data structure, the data field will contain data indicating the value to which the particular variable of interest is to be set.

The NVMP protocol 108 is advantageous in the present invention because it provides a low overhead structure and method for gathering environmental and module identification information.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended as limiting. The invention is limited only as defined in the following claims and the equivalents thereto.

Module (map for second microprocessor controller system)

SCC = Second Microprocessor Controller System

Shared memory is located at F800h—FFFFh, where F803h—FBFEh is writable by the SSC. F800h is the ack byte and F801h is the ack-ack byte for the SSC.

This module will receive a hardware interrupt from the host when there is a message in shared memory or when there is a diagnostic message to read from the interrupt code byte at 0FFFFh. It will interrupt the host by writing to location 0FFFEh.

The interrupt codes are:

```
00    non-diagnostic message in shared memory
(diagnostic interrupt codes)

req   01   request status (written by SSC or host)
req   02   SSC should read data=addr pattern in DP (dual port RAM) (written by host)
req   03   SSC should read data=~addr pattern in DP (written by host)
req   04   SSC should write data=addr pattern in DP (written by host)
req   05   SSC should write data=~addr pattern in DP (written by host)
ack   81   running power-up diagnostics (host_status = testing) (written by host)
ack   82   running peripheral diagnostics (host_status = testing) (written by host)
ack   83   running operational firmware (host_status = OK) (written by SSC or host)
ack   84   SSC read data=addr pattern in DP (written by SSC)
ack   85   SSC read data=~addr pattern in DP (written by SSC)
ack   86   SSC wrote data=addr pattern in DP (written by SSC)
ack   87   SSC wrote data=~addr pattern in DP (written by SSC)
err   F0   error running power up diagnostics (host_status = failure) (written by host)
err   F1   error running peripheral diagnostics (host_status = crippled) (written by SSC or
           host)
err   F2   error running operational firmware (host_status = failure) (written by host)
err   F3   SSC error reading data=addr pattern in DP (set ssc_status and host_status to no
           DPRAM communication)(written by SSC)
err   F4   SSC error reading data=~addr pattern in DP (indicate DPRAM failure) (written
           by SSC)
err   F5   SSC error writing data=addr pattern in DP (not sure how the SSC can detect)
           (written by SSC)
```

| | | |
|---|---|---|
| err | F6 | SSC error writing data=~addr pattern in DP (an error writing to DPRAM) (written by SSC) |

The valid ack or ack/ack codes are:
decode message on-board—01h
send message off board—02h
update message—03h
received message—80h Module (map for Networking Module CPU side)

Shared memory is located at ab000000h—ab0007FFh, where ab000401—ab0007FDh is writable by the host. ab0003FFh is the ack byte and ab000400h is the ack-ack byte for the host.

This module will receive a hardware interrupt from the host when there is a message in shared memory or when there is a diagnostic message to read from the interrupt code byte at ab0007FEh. It will interrupt the host by writing to location ab0007FFh.

The interrupt codes are:

| | | |
|---|---|---|
| 00 | | non-diagnostic message in shared memory |
| (diagnostic interrupt codes) | | |
| req | 01 | request status |
| ack | 83 | running operational firmware (host_status = OK) |

All other diagnostics interrupts will be used by the diagnostic image of the host only.

What is claimed is:

1. In a networking chassis including a plurality of plug-in networking modules, each module having a processor for processing data, a first system management bus coupled to each networking module, and a second system management bus coupled to each networking module, a fault-tolerant communication and control system disposed on each networking module, comprising:

a primary path for transmission of communication and control information that controls the networking module, the primary path including a first microprocessor controller coupled between the first system management bus and the processor; and a secondary path for transmission of the communication and control information including a second microprocessor controller and a dual-port memory, the second microprocessor controller coupled to the second system management bus and to one port of the dual-port memory, the other port of the dual-port memory being coupled to the processor;

wherein upon failure of the primary path, the secondary path is used to transmit the communication and control information.

2. The system of claim 1, wherein information concerning the status of the module is stored in the memory by the processor.

3. The system of claim 1, wherein the first microprocessor controller and the second microprocessor controller are powered by different power supplies.

4. The system of claim 1, wherein the second microprocessor controller includes a non-volatile memory containing network variables.

5. The system of claim 4, wherein the second microprocessor controller includes a network variable monitoring protocol module for gathering, storing and transmitting the network variables.

6. The system of claim 4, wherein the network variables include at least one of environmental information and module identification information.

7. The system of claim 6, wherein the environmental information includes one or more of a power supply voltage, a power supply current, and a temperature of the module.

8. The system of claim 6, wherein the module identification information includes one or more of a module part number, serial number, and revision level.

9. The system of claim 1, wherein the module includes hardware and software for performing networking functions including at least one of bridging and routing.

10. The system of claim 1, further including a chassis and a chassis management agent running on the network module for providing system management information on the busses.

11. The system of claim 1, including a reset line coupling the second microprocessor controller and processor for resetting the processor in the event of failure of the primary path.

12. The system of claim 1, including a reset line coupling the second microprocessor controller and processor for allowing the processor to reset the second microprocessor controller.

13. The system of claim 1, wherein the memory includes a non-volatile memory.

14. In a networking chassis including a plurality of plug-in networking modules, each module having a processor for processing data, a first system management bus coupled to each networking module, and a second system management bus coupled to each networking module, a fault-tolerant method of transmitting communication and control information that controls the networking module, comprising the steps of:

transmitting communication and control information over a primary path including a first microprocessor controller coupled between the first system management bus and the processor; and transmitting, in the event of failure of the primary path, the communication and control information over a secondary path including a second microprocessor controller coupled to the second system management bus and to one port of a dual-port memory, the other port of the dual-port memory being coupled to the processor.

15. The method of claim 14, further comprising the step of storing status of the module in the memory by the processor.

16. The method of claim 14, further comprising the step of storing network variables in the second microprocessor controller.

17. The method of claim 14, further comprising the steps of gathering, storing, and transmitting the network variables by the second microprocessor controller using a network variable monitoring protocol.

18. The method of claim 17, wherein the network variables include at least one of environmental information and module identification information.

19. The method of claim 18, wherein the environmental information includes one or more of a power supply voltage, a power supply current, and a temperature of the module.

20. The method of claim 18, wherein the module identification information includes one or more of the module part number, serial number and revision level.

21. A networking module having a processor for processing data, a means for connection to a first system management bus, and a means for connection to a second management bus, comprising:

a primary path for transmission of communication and control information that controls the networking module, the primary path including a first microprocessor controller coupled between the processor and the means for connection to a first system management bus; and a secondary path for transmission of the communication and control information, the secondary path including a second microprocessor controller and a dual-port memory, the second microprocessor controller coupled to the means for connection to a second system management bus and to one port of the dual-port memory, the other port of the dual-port memory being coupled to the processor;

wherein upon failure of the primary path, the secondary path is used to transmit the communication and control information.

* * * * *

UNITED STATES PATENT AND TRADEMARK OFFICE
CERTIFICATE OF CORRECTION

PATENT NO. : 5,485,576
DATED : January 16, 1996
INVENTOR(S) : Fee, et al

It is certified that error appears in the above-indentified patent and that said Letters Patent is hereby corrected as shown below:

On the title page, item [54],

In The Title: The title should read as follows:

FAULT TOLERANT SYSTEM MANAGEMENT BUS
        ARCHITECTURE FOR A NETWORKING CHASSIS Signed and Sealed this Twenty-fifth Day of June, 1996

Attest:

BRUCE LEHMAN

*Attesting Officer*     *Commissioner of Patents and Trademarks*